United States Patent [19]
Narita

[11] Patent Number: 5,786,904
[45] Date of Patent: Jul. 28, 1998

[54] APPARATUS AND METHOD FOR PREPARING INDEX PRINTS BASED ON THE NUMBER OF FRAMES TO BE INDEXED

[75] Inventor: Toshihiko Narita, Kanagawa, Japan

[73] Assignee: Fuji Photo Film Co., Ltd., Kanagawa, Japan

[21] Appl. No.: 390,764

[22] Filed: Feb. 17, 1995

[30] Foreign Application Priority Data

Feb. 21, 1994 [JP] Japan ................... 6-022616

[51] Int. Cl.⁶ .................. H04N 1/04; G03F 3/10
[52] U.S. Cl. ............... 358/487; 358/527; 358/471
[58] Field of Search ................ 358/487, 527, 358/474, 471; 395/145, 146, 147, 148; 355/20, 29, 32, 45, 67, 71

[56] References Cited

U.S. PATENT DOCUMENTS

| | | | |
|---|---|---|---|
| 4,933,773 | 6/1990 | Shiota et al. | 358/302 |
| 4,991,004 | 2/1991 | Hayashi et al. | 358/76 |
| 5,184,227 | 2/1993 | Foley | 358/302 |
| 5,400,152 | 3/1995 | Manico et al. | 358/501 |

FOREIGN PATENT DOCUMENTS 1-96634  4/1989  Japan ............. G03B 27/32

*Primary Examiner*—Thomas D. Lee
*Attorney, Agent, or Firm*—Sughrue, Mion, Zinn, Macpeak & Seas, PLLC

[57] ABSTRACT

To obtain an index print prepared by effectively utilizing photographic paper, magnetic information is read in accordance with feed of a negative film (202, 204), and a relevant index format is selected according to a number of photograph frames of the negative film to determine an index print size corresponding to the selected index format (206, 208). Next, each frame is subjected to exposure processing to accumulate image data respondent to the index format (210). Upon completion of the exposure processing of the negative film, the accumulated image data are read (212) to conduct index printing by using the read image data to cut in accordance with the index print size (214, 216). Accordingly, an index print is produced in a size respondent to a number of frames.

14 Claims, 12 Drawing Sheets

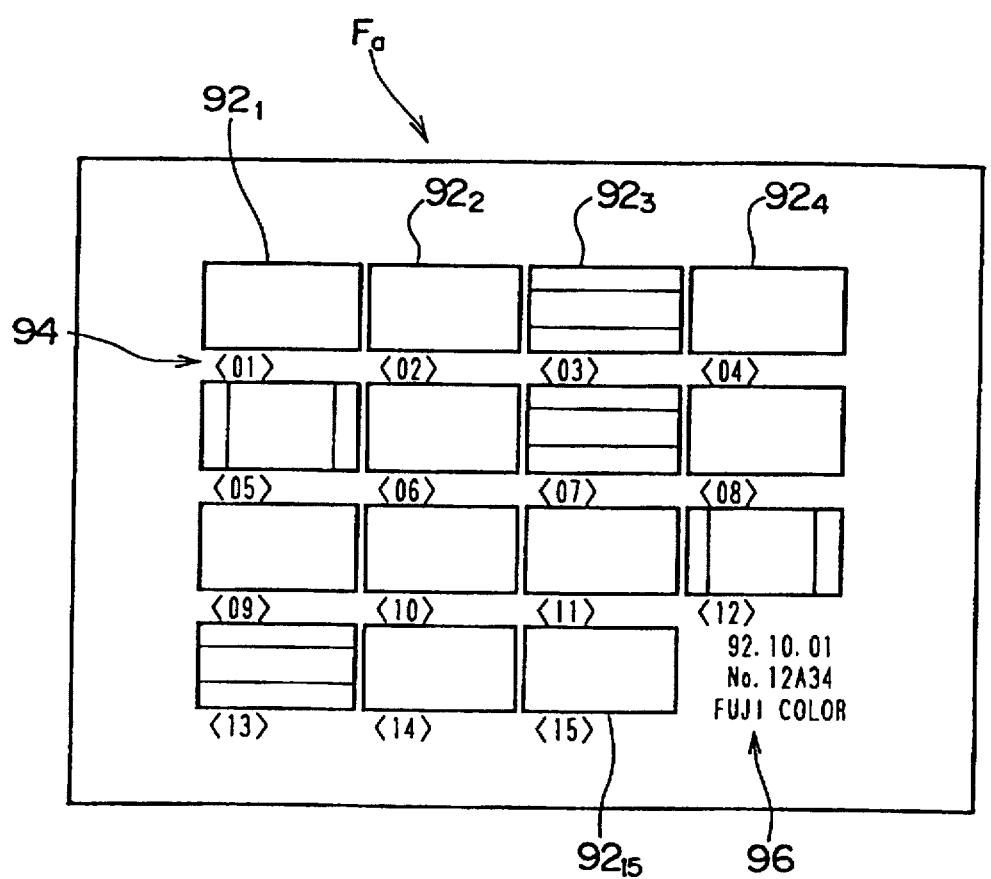

APPARATUS AND METHOD FOR PREPARING INDEX PRINTS BASED ON THE NUMBER OF FRAMES TO BE INDEXED

BACKGROUND OF THE INVENTION

1. Field of the Invention

The present invention relates to an apparatus and a method for preparing index prints, and in particular relates to an apparatus and a method for preparing index prints for forming, on one print, all image frames corresponding to one roll of photographic film.

2. Description of the Prior Art

One roll of photographic film has a plurality of frames capable of use for photographing. Several types are available, such as those for photographing 12, 24 or 36 shots, depending on the number of frames. An index print capable of corresponding to photographed images has been hitherto given to the customer in some cases to indicate the contents of the images photographed on one roll of photographic film. On the index print, images of a predetermined number of frames in a predetermined size, for example, 25 images (5×5) have been formed by using a size of one sheet of paper. Therefore, one index print has been given to the customer in case of photographic films for photographing 12 or 24 shots, and two index prints have been given to the customer in case of a photographic film for photographing 36 shots.

Accordingly, when the index print(s) having images of the predetermined number of frames in the predetermined size is (are) used, 13 frames with no recorded image or 1 frame with no recorded image remain in the index print for the photographic films for photographing 12 shots or 24 shots, and 14 frames with no recorded image remain on a second index print for the photographic film for photographing 36 shots. Thus the entire surface of the index print has not been utilized effectively.

For this reason, an apparatus for preparing index prints has been proposed, in which the contraction factor of the size of frames to be recorded on an index print is changed so as to include all photograph frames in one index print (see Japanese Patent Laid-open No. 1-96634).

However, in the conventional apparatus for preparing index prints, index frames become small as the number of frames increases, because the size of images formed on the index print varies depending on a number of photographed image frames. Thus a user has sometimes experienced problems in recognizing a desired image frame.

SUMMARY OF THE INVENTION

Considering the facts described above, it is an object of the present invention to obtain an apparatus and a method for preparing index prints, in which the entire surface of an index print can be utilized effectively, and a user can make recognition easily and appropriately.

In order to achieve the object described above, an apparatus for preparing index prints according to the present invention includes image storing means for storing images obtained by image pick-up from photograph frames formed on a photographic film, photograph frame number detecting means for detecting a number of photograph frames on the photographic film, storing means for storing plural pieces of index format information which determine arrangements of the photograph frames, selecting means for selecting a piece of index format information from the plural pieces of index format information in accordance with the number of photograph frames, and forming means for forming an index print of the photographic film by printing the stored images onto printing paper to correspond to an arrangement of the selected piece of index format information.

The photograph frame number detecting means can detect the number of photograph frames by reading previously recorded photograph frame number information for representing the number of photograph frames of the photographic film.

The forming means can form the index print of the photographic film by sequentially printing the images onto the printing paper having a print size corresponding to the detected piece of index format information.

The size of the images to be printed onto the printing paper may be previously determined, and the size of the printing paper may be determined depending on the number of the stored images.

The apparatus for preparing index prints according to the present invention includes the image storing means. The image storing means stores the images obtained by photographing the photograph frames formed on the photographic film. The photograph frame number detecting means detects the number of photograph frames on the photographic film. The number of photograph frames may be a number of all photograph frames capable of use for photographing on the photographic film, or a number of photograph frames excluding photograph frames which are not subjected to photographing or have photographic failure.

The number of photograph frames can be detected by using a distance of feed of the photographic film, counting a number of photograph frames, or using a previously input number of photograph frames. If any photograph frame number information is stored in the photographic film, the number of photograph frames or the number of photograph frames capable of use for photographing on the photographic film can be detected by reading the photograph frame number information of the photographic film. The storing means stores plural pieces of index format information which determine arrangements of the photograph frames. The selecting means selects a piece of index format information from the plural pieces of index format information in accordance with the number of detected photograph frames. The forming means forms the index print of the photographic film by sequentially printing the stored images onto the printing paper to correspond to an arrangement of the selected piece of index format information.

The forming means can form the index print of the photographic film by sequentially printing the images onto the printing paper having a print size corresponding to the detected piece of index format information. The size of images to be printed onto the printing paper for the index print may be previously determined, and the size of the printing paper may be determined depending on the number of stored images.

Accordingly, the formed index print can be formed on one print corresponding to the predetermined piece of index format information, and the entire printing paper can be utilized effectively.

In the foregoing, when all photograph frames capable of use for photographing on the photographic film are detected, the index print can be formed for one roll of photographic film as having blanks for photograph frames not subjected to photographing or having photographic failure. Thus any photograph frame can be easily collated with a corresponding photograph frame not subjected to photographing or having photographic failure, if any. Alternatively, when a number of photographic frames excludes photographic frames not subjected to photographing or having photographic failure is determined, an index print can be formed, which contains only photograph frames capable of being printed contained on one roll of photographic film. Thus the size of the index print can be appropriately set, and no photograph frame not subjected to photographing or having photographic failure is index-printed as an empty frame. Accordingly, the index print can be utilized by a user as information of only photograph frames satisfactory for printing, and the printing paper can be utilized effectively.

BRIEF DESCRIPTION OF THE DRAWINGS

The invention will now be described with reference to the accompanying drawings wherein:

FIG. 13 is an image view showing an index print corresponding to a negative film containing photograph frames photographed in different sizes.

EMBODIMENT

An embodiment of the present invention will be explained below in detail with reference to the drawings. In this embodiment, the apparatus for preparing index prints according to the present invention is applied to a photograph printer (so-called "digital printer") which forms prints by converting images photographed on a negative film into digital images.

Figure 2:
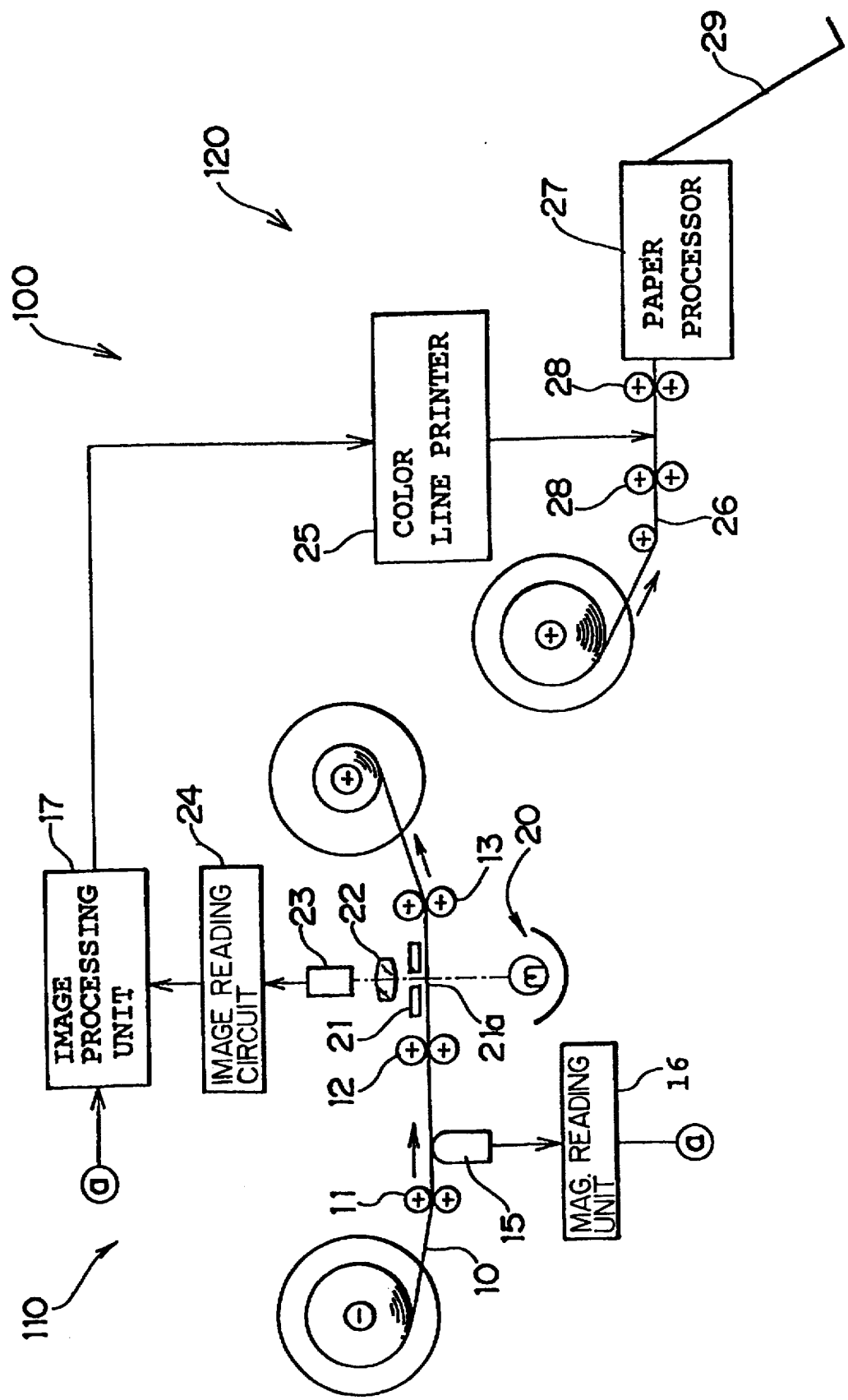
FIG. 2 is a block diagram showing a schematic construction of a photograph printer to which the present invention can be applied.

As shown in FIG. 2, a photograph printer 100 of this embodiment comprises a film processing unit 110 for conducting processing such as reading of photographed images from a negative film, and a paper processing unit 120 for exposing images onto a color paper sheet in accordance with the read photographed images and for conducting processing such as development (details will be described below).

A negative film 10 on which development processing has been made is arranged in the film processing unit 110. The negative film 10 is fed by pairs of feed rollers 11, 12 and 13. A magnetic head 15 is arranged between the pairs of feed rollers 11, 12 to allow it to contact with the negative film 10. The magnetic head 15 is a device for reading magnetic information recorded in a magnetic layer (details will be described below) of the negative film 10 during the feed of the negative film 10. The magnetic head 15 is connected to a magnetic reading unit 16. The magnetic reading unit 16 converts output signals outputted from the magnetic head 15 into information containing magnetic information relevant to index printing described below, and then outputs them to an image processing unit 17 including a main microprocessor 68 (FIG. 3) for executing a main control routine (FIG. 1) described below.

A light source unit 20 is arranged between the pairs of feed rollers 12, 13 and under the negative film 10. A slit plate 21, a lens 22 and a line sensor 23 are arranged in this order over the light source unit 20 beyond the negative film 10. The slit plate 21 has a long and narrow slit 21a formed in the widthwise direction of the negative film 10. An image (linear image) on the negative film 10 irradiated by the light source unit 20 passes through the slit 21a, and is focused on a device surface of the line sensor 23 by the lens 22.

The line sensor 23 comprises a color line sensor with a plurality of arranged CCD devices and arranged color filters of R, G and B on each of device surfaces, and is connected to an image reading circuit 24. The image reading circuit 24 takes in image data of each of the three colors of the negative film 10 through the line sensor 23 in synchronization with the feed of the negative film 10. The taken-in image data is output to the image processing unit 17. Alternatively, instead of the use of the color line sensor 23, the light may be measured by using line sensors which are exclusive for each of the colors with respective color filters of R, G and B arranged in monochrome line sensors. A two-dimensional image sensor may be used without using the line sensor. Image data can be obtained in a stopped state of the negative film 10 by using the two-dimensional sensor.

The image processing unit 17 is a processing unit for processing image data considering input magnetic information. It outputs processed image data to a color line printer 25 of the paper processing unit 120. The paper processing unit 120 is constituted to include the color line printer 25 and a paper processor 27. A lengthy color paper sheet 26 is loaded in the color line printer 25. The color line printer 25 performs main scanning in the widthwise direction of the color paper sheet 26 by using a laser beam, and performs sub-scanning by feeding the color paper sheet 26 by using pairs of feed rollers 28 at a speed coinciding with a processing speed of the paper processor 27. Thus the color paper sheet 26 is exposed and printed on the basis of image data from the image processing unit 17. The color paper sheet 26 which has been subjected to the exposure and printing is fed to the paper processor 27 as it is, and is developed and processed in the paper processor 27. After completion of the development processing, the color paper sheet 26 is cut for individual frames in the paper processor 27, to be discharged to a photograph receiving tray 29.

Figure 3:
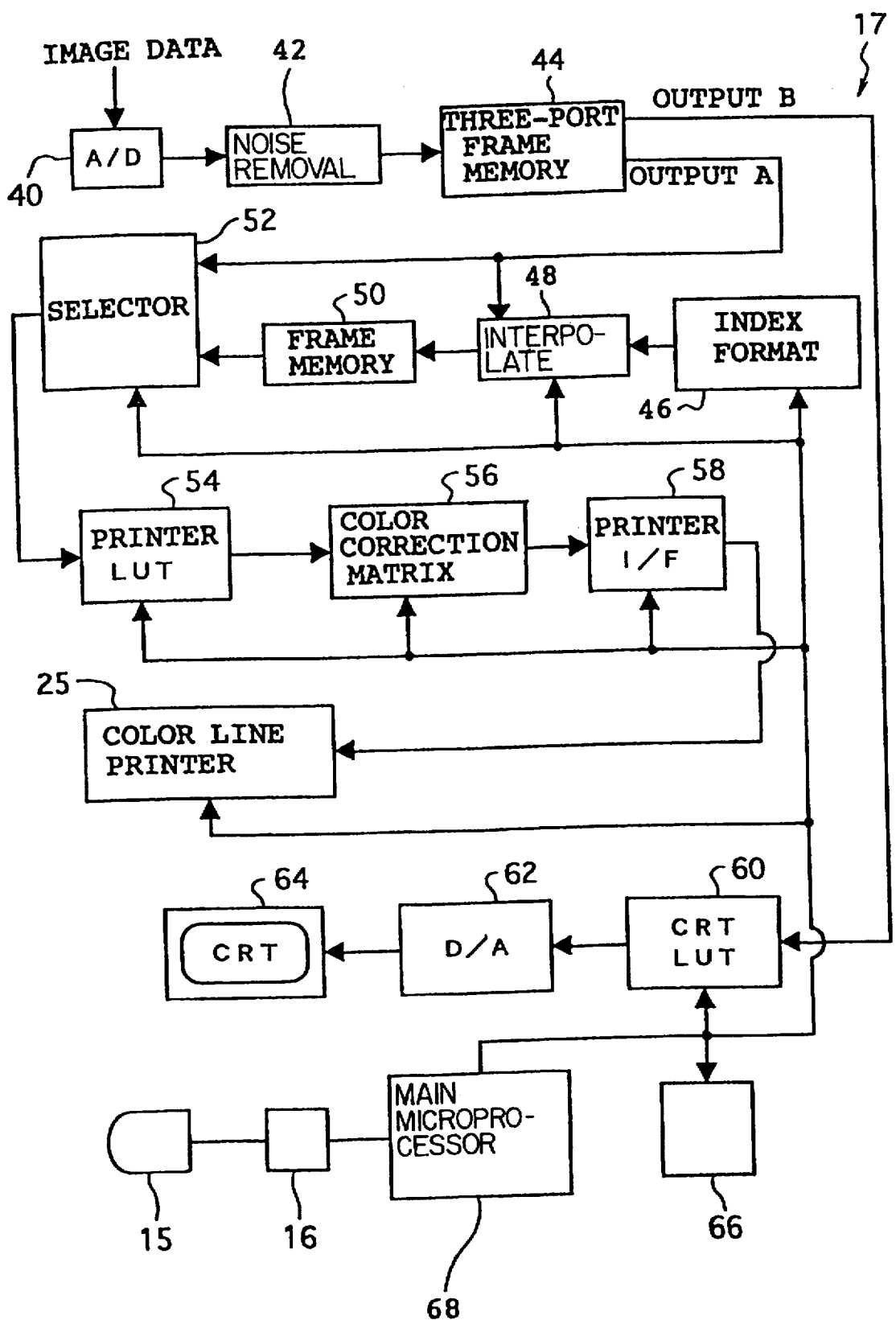
FIG. 3 is a block diagram showing a schematic construction of an image processing unit of the photograph printer according to the present invention.

As shown in FIG. 3, the image processing unit 17 is constituted to include a main microprocessor 68. Image data of three colors output from the image reading circuit 24 are input into the image processing unit 17. The image data of three colors are converted into digital data in an A/D converter 40, and are output to a noise removing circuit 42. The noise removing circuit 42 is a circuit for removing noises generated during the conversion into digital data or the like. It removes noises by multiplying the image data, for example, by a coefficient (1−k). The image data are output to a three-port frame memory 44. The frame memory 44 has functions to output image data each having different transfer speeds. Namely, by allowing the frame memory 44 to have two types of output functions having different transfer speeds, the image data can be outputted at an approximately identical timing to peripheral equipment having different transfer speeds (for example, equipment having different transfer speeds such as CRT and a photograph printer). In the followings, the output of the frame memory 44 corresponding to a slow transfer speed is an output A, and the output of the frame memory 44 corresponding to a fast transfer speed is an output B. The output A has a transfer speed for output to the printer, and the output B has a transfer speed for display on CRT.

The image data from the output B are subjected to γ-correction in a look-up table memory (hereinafter referred to as "LUT") 60 for CRT, and are input into a D/A converter 62. In the D/A converter 62, input digital signals are converted into analog signals. The converted analog signals are input into CRT 64. LUT 60 is provided for density conversion to enable optimum display on CRT. LUT 60 is constituted by a high speed memory. It can convert color tone by previously writing data corresponding to each address from the main microprocessor 68. The main microprocessor 68 can conduct rewriting of data of LUT 60 as well as, for example, rewriting of data of LUT 54 as described below, change of coefficient of color correction matrix, selection of index format, instruction of print size to the color printer 25, and setting of image data to be output from a selector 52. Additionally, the main microprocessor 68 is also connected to a memory/timing controller 66.

The image data from the output A are transferred to the printer, and the same image data are output to an image interpolation circuit 48. Namely, the image data are read from the output A of the frame memory 44 when the image data of images frozen in the frame memory 44 are transferred to the printer. The image data are input into LUT 54 for the printer through the selector 52. LUT 54 for the printer is provided for gradation conversion of the image data from the frame memory 44. Correction data corresponding to correction values inputted from a keyboard are stored in LUT 54. The gradation is converted on the basis of the correction data. The image data subjected to the gradation conversion are conformed to color characteristics of the color paper sheet or the like by using a color correction matrix circuit 56, and are output to the line printer 25 through an interface (I/F) 58 for the printer.

The image data to be input into the image interpolation circuit 48, which are the image data from the output A, are used as image data for index printing. The image interpolation circuit 48 contracts and interpolate the images in order to adapt the images frozen in the frame memory 44 to a size of a index frame based on a predetermined frame size (for example, L size). The index frame is an image frame corresponding to one image formed on an index print including images contained in one roll of photographic film on one print. For the contracting interpolation, for example, the interpolation may be conducted by thinning out the image data belonging to an image in accordance with a predetermined pattern or predetermined intervals. The image interpolation circuit 48 is connected to an index format storing unit 46 which stores index formats differing in accordance with the number of frames contained in one roll of photographic film (see FIGS. 7, 8 and 9). The image data of images contracted in the image interpolation circuit 48 are output to a frame memory 50 for index printing.

Accordingly, when the printing for one roll of photographic film is completed, the frame memory 50 for index printing stores the image data to enable formation of one print in a form in which all images on one roll of photographic film are adapted to a size of index frames. Accordingly, setting of the selector 52 to the side of the frame memory 50 upon completion of printing for one roll of photographic film allows input into LUT 54 for the printer in the same manner as the transfer of the image data of images frozen in the aforementioned frame memory 44 to the printer. The image data subjected to the gradation conversion in LUT 54 for the printer are conformed to color characteristics of the color paper sheet or the like by the color correction matrix circuit 54, and are output to the line printer 25 through the interface (I/F) 58 for the printer.

In this embodiment, as for the index format described above, an index format Fa for 15 frames (FIG. 7) is used for a negative film in which the number of frames capable of use for photographing on one roll of negative film 10 is not more than 15 frames. An index format Fb for 27 frames (FIG. 8) is used for a negative film in which the number of frames capable of use for photographing exceeds 15 frames but is not more than 27 frames. An index format Fc for 39 frames (FIG. 9) is used for a negative film in which the number of frames capable of use for photographing exceeds 27 frames but is not more than 39 frames. These corresponding relations are because ordinary negative films are commercially available as having numbers of frames capable of use for photographing of 12, 24 and 36 frames, and those having 27 or 39 frames are commercially available for use for convenient cameras or the like. Accordingly, by using three types of index formats, it is possible to optimally classify substantially all types of negative films into three so as to enable forming of one sheet of index format print for each type of negative films. Sizes of height and width change for each of the index formats. However, it is possible to form prints of each size with a coincident length in the widthwise direction. When forming prints of each of the sizes with a coincident length in the widthwise direction, the size of index frames can be determined to make coincidence. The present invention does not limit the type of the index format to the three types, and two or four or more types are acceptable. For example, it is possible to deal with groups of films having numbers of photograph frames which are different from those described above (for example, negative films having 25 or 40 frames), by adding an exclusive index format which is different from those described above, or an optimum format for preparing one sheet of index print for each of those negative films.

Figure 7:
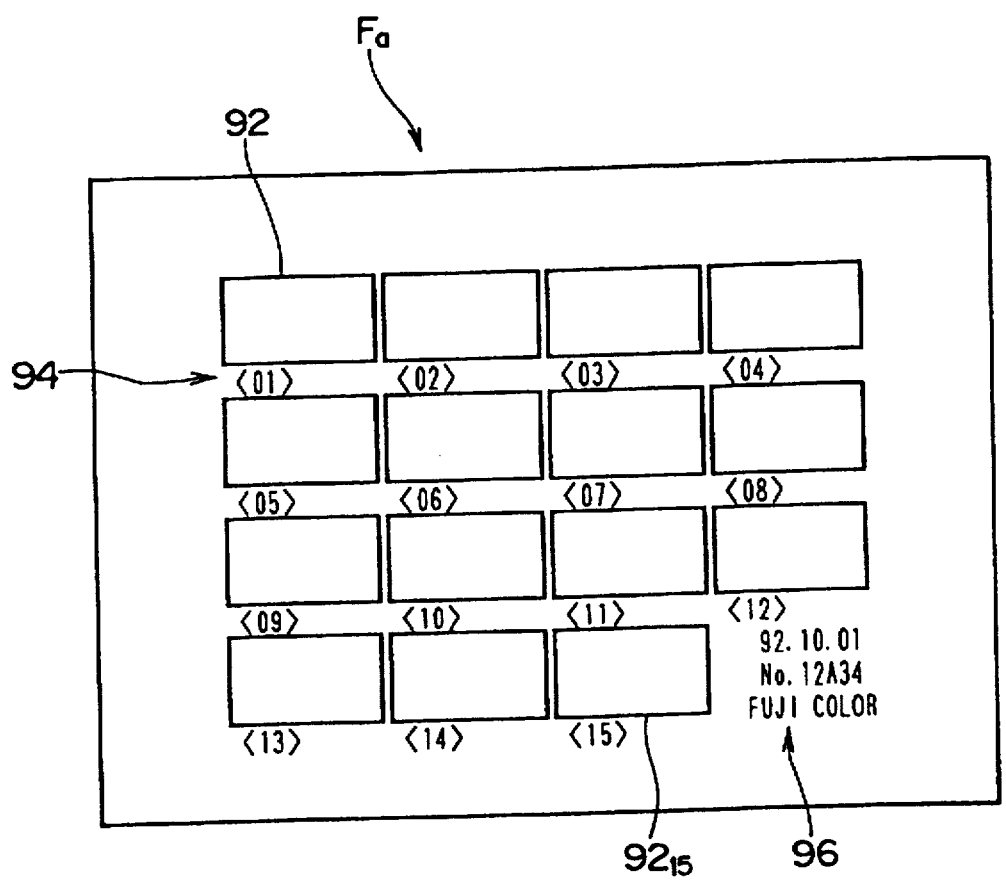
FIG. 7 is an image view showing an index format for 15 frames.

As shown in FIG. 7, the index format Fa for 15 frames has a print size corresponding to the L size (89×127 mm, aspect ratio: 1.46), which is set to be able to accommodate index frames 92 of 15 frames (4×4 frames, 1 frame: label section) in the L size print. A lower section under each of the index frames 92 is a print number section 94 for printing a numeral corresponding to a frame number. A blank space continued to the final index frame $92_{15}$ is a label section 96 for printing information such as date of generation of the index print, film number and film type.

Figure 8:
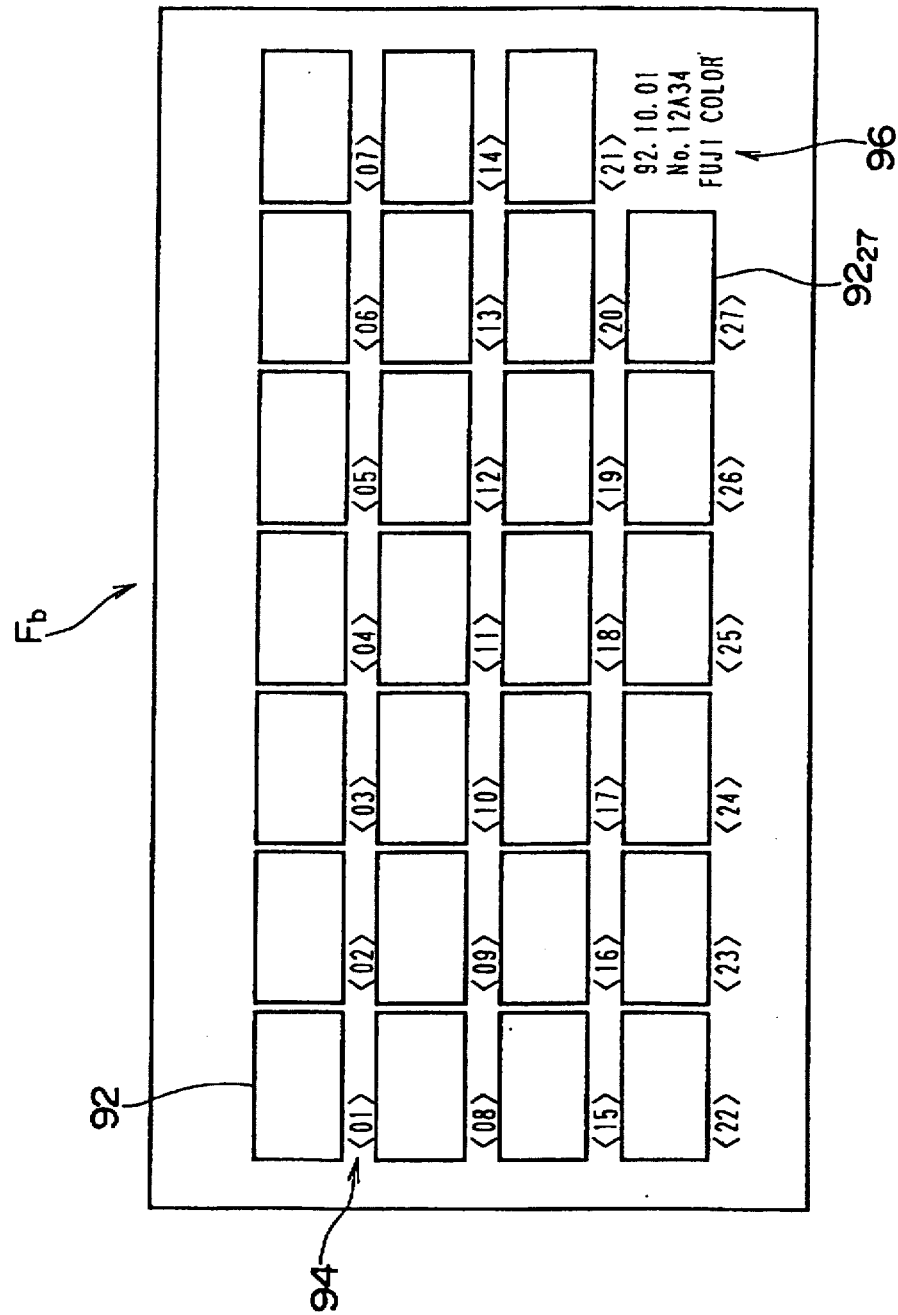
FIG. 8 is an image view showing an index format for 27 frames.
Figure 9:
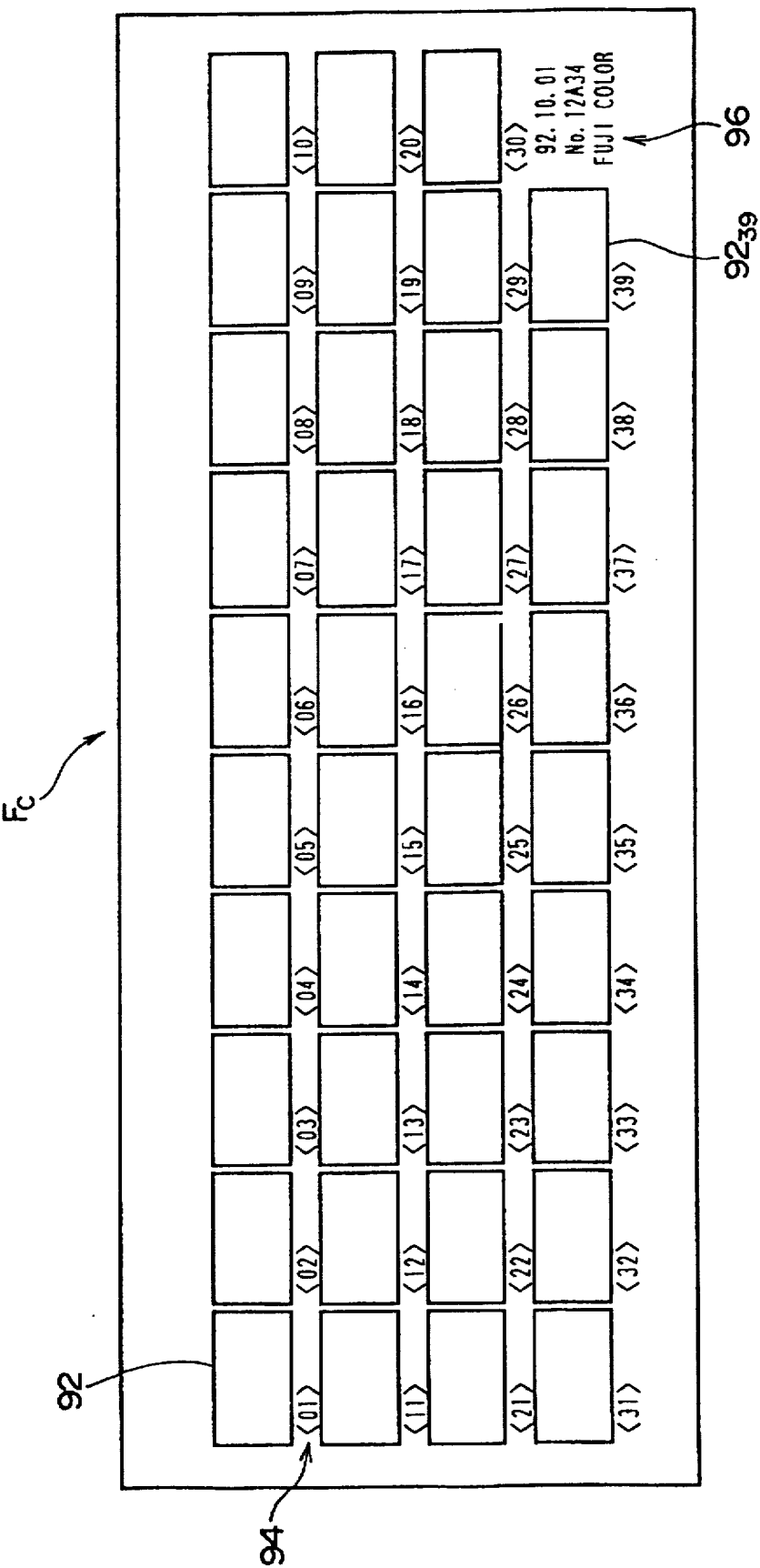
FIG. 9 is an image view showing an index format for 39 frames.

As shown in FIG. 8, the index format Fb for 27 frames has a print size corresponding to the H size (high-vision: HDTV, high quality television size, 89×158 mm, aspect ratio: 1.78), which is set to be able to accommodate index frames 92 of 27 frames (7×4 frames, 1 frame: label section) in the H size print. A print number section 94 is provided at a lower section under each of the index frames 92. A label section 96 is provided at a blank space continued to the final index frame $92_{27}$. Similarly, the index format Fc for 39 frames shown in FIG. 9 has a print size corresponding to the P size (panorama size, 89×254 mm, aspect ratio: 2.85), which is set to be able to accommodate index frames 92 of 39 frames (10×4 frames, 1 frame: label section) in the P size print. A print number section 94 is provided at a lower section under each of the index frames 92. A label section 96 is provided at a blank space continued to the final index frame $92_{39}$.

It is also possible that the contents to be written in the label section 96 described above are written outside the region of the index frames, and an index frame is arranged at the label section 96 to increase the number of frames.

Figure 5:
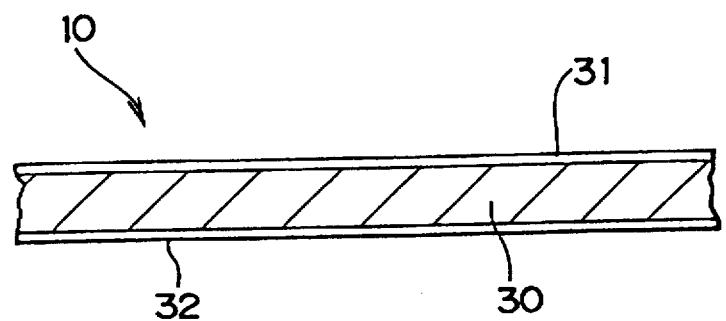
FIG. 5 is a cross-sectional view of a negative film.

The negative film 10 used in this embodiment will now be explained with reference to FIGS. 5 and 6. As shown in FIG. 5, the negative film 10 has an emulsion layer 31 provided on an upper surface of a transparent base 30 for an image to be exposed and recorded. A magnetic recording layer 32 including a transparent magnetic material applied on an entire surface of the negative film 10 is provided on a lower surface of the transparent base 30 in FIG. 5. In the magnetic recording layer 32, magnetic particles contained as a magnetic layer have a reduced charging factor to decrease the optical transmitting density.

Figure 6:
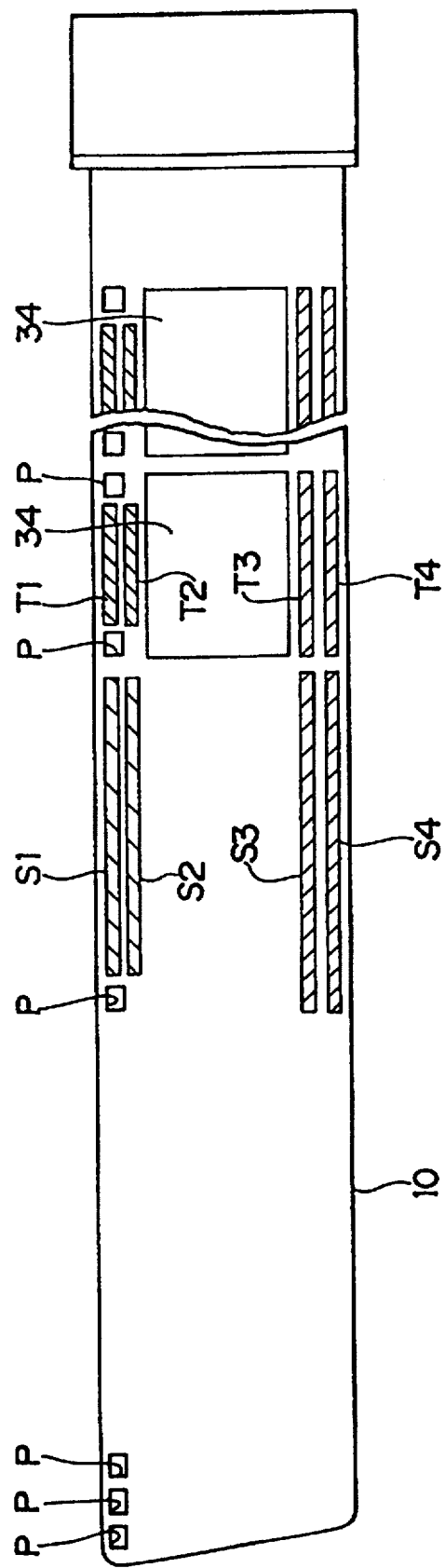
FIG. 6 is an exemplary format for recording magnetic information of a negative film.

As shown in FIG. 6, magnetic recording and reading regions to be used in this embodiment comprise tracks S1, S2, S3 and S4 at a portion with no recorded image frame 34 at a forward end of the negative film 10, and tracks T1, T2, T3 and T4 corresponding to each of the image frames 34. The magnetic recording layer 32 described above may be formed by application along the longitudinal direction of the negative film 10 without the region of the image frames 34 on the negative film 10. The negative film 10 is provided with a plurality of perforations P to correspond to the image frames 34 to be photographed by a camera (not shown). In the example in FIG. 6, a pair of perforations P are respectively provided at the forward end of the negative film 10, at a portion for recording information of camera or the like before photographing, and near the end of the image frame corresponding to the image frame 34 subjected to photographing. For example, the tracks S1 to S4 are regions for recording information required for each roll of the negative film 10, that is information of the number of those capable of use for photographing in this embodiment (i.e., the number of frames), and the tracks T1 to T4 are regions for recording information required for each of the image frames 34.

Figure 4:
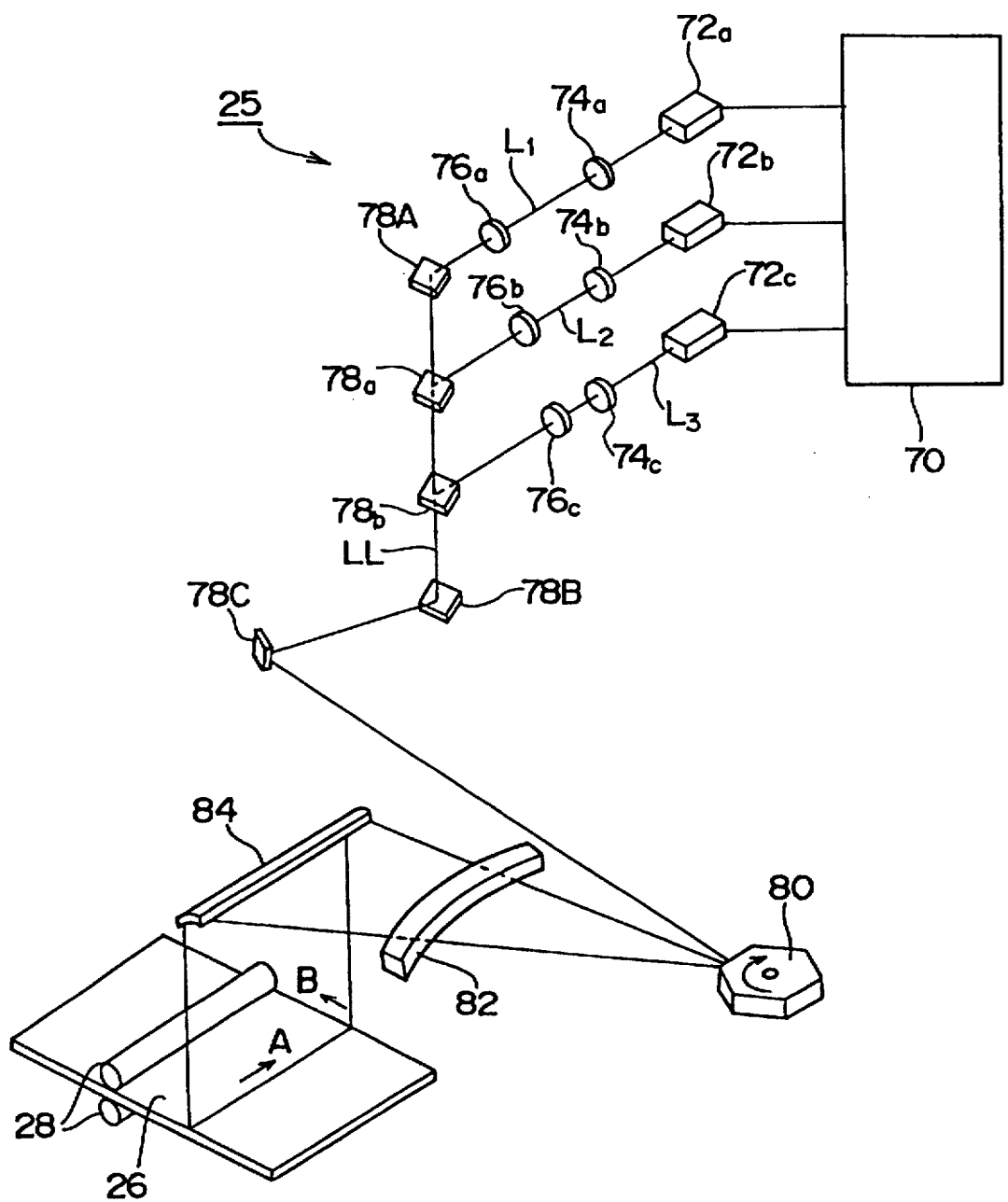
FIG. 4 is a block diagram showing a schematic construction of a color line printer.

As shown in FIG. 4, the line printer 25 includes semiconductor lasers 72a, 72b and 72c. Each of the semiconductor lasers 72a, 72b and 72c is energized by a printer controller 70 including a microprocessor (not shown). The semiconductor laser 72a projects a laser beam L1 in an infrared region having a wavelength of, for example, 670 nm. The semiconductor lasers 72b and 72c respectively project laser beams L2 and L3 having wavelengths of 810 nm and 750 nm. The wavelengths of the laser beams L1, L2 and L3 correspond to each of colors of magenta, yellow and cyan subjected to color development upon exposure of the color paper sheet 26. Each of the semiconductor lasers for projecting the laser beams L1, L2 and L3 of these wavelengths are available extremely easily.

A collimator lens 74a for converting the laser beam L1 into a parallel luminous flux is arranged on a side of projection of the laser beam of the semiconductor laser 72a. A cylindrical lens 76a and a reflection mirror 78A are provided, being distanced from the collimator lens 74a by predetermined intervals. In the same manner, collimator lenses 74b, 74c are respectively arranged on sides of projection of the laser beams of the semiconductor lasers 72b and 72c. Cylindrical lenses 76b, 76c are provided, being distanced from the collimator lenses 74b, 74c by predetermined intervals.

Dichroic mirrors 78a, 78b are arranged on the light path of the laser beams L2, L3 transmitting through the cylindrical lenses 76b, 76c. The reflection mirror 78A has the same inclination angle as those of the dichroic mirrors 78a, 78b to lead each of the laser beams L1, L2 and L3 to an identical light path LL. The dichroic mirror 78a transmits the laser beam L1, and reflects the laser beam L2. On the other hand, the dichroic mirror 78b has a function to transmit the laser beams L1 and L2 and reflect the laser beam L3.

The laser beams L1, L2 and L3 having arrived at the identical light path LL are reflected by reflection mirrors 78B, 78C, and then proceed to a polygon mirror 80. The polygon mirror 80 rotates in a direction of an arrow. The laser beams L1, L2 and L3 reflected by the polygon mirror 80 pass through an fθ lens 82. They are reflected by a cylindrical mirror 84 for surface error correction, and subjected to main scanning in a direction of an arrow A on the color paper sheet 26. The color paper sheet 26 is fed by rotation of the feed rollers 28 in a direction of sub-scanning (direction of an arrow B) approximately perpendicular to the main scanning direction. Thus an image is formed on the color paper sheet 26. The feed rollers 28 are rotated by a driving means (not shown) connected to the printer controller 70.

The semiconductor laser 72a described above is a semiconductor laser of an anode common type constituted by a laser diode and a photodiode. The laser diode projects the laser beam L1 in accordance with a control signal (modulation signal) from the printer controller 70. The photodiode detects an optical output of the laser beam L1 projected from the laser diode. The semiconductor laser 72b is a semiconductor laser of a cathode common type constituted by a laser diode and a photodiode. The semiconductor laser 72c is a semiconductor laser of a cathode common type constituted by a laser diode and a photodiode. These semiconductor lasers 72a, 72b and 72c (namely the laser diodes and the photodiodes) are connected to the printer controller 70.

Figure 11:
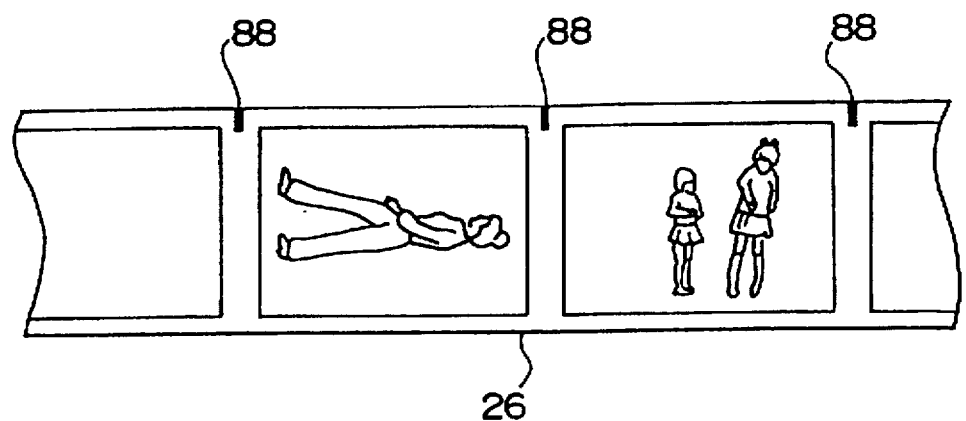
FIG. 11 is an image view showing cut marks for cutting a color paper sheet.

The line printer 25 has a function to expose cut marks shown in FIG. 11 to be positioned at blank spaces between exposed adjacent frames on the color paper sheet 26 upon completion of input of the image data, or in accordance with a control signal from the main processor 68. The color paper sheet 26 is cut into individual printed and exposed frames by using a cutter (not shown) after drying the color paper sheet 26 in the paper processor 27 on the basis of the cut marks 88.

Figure 1:
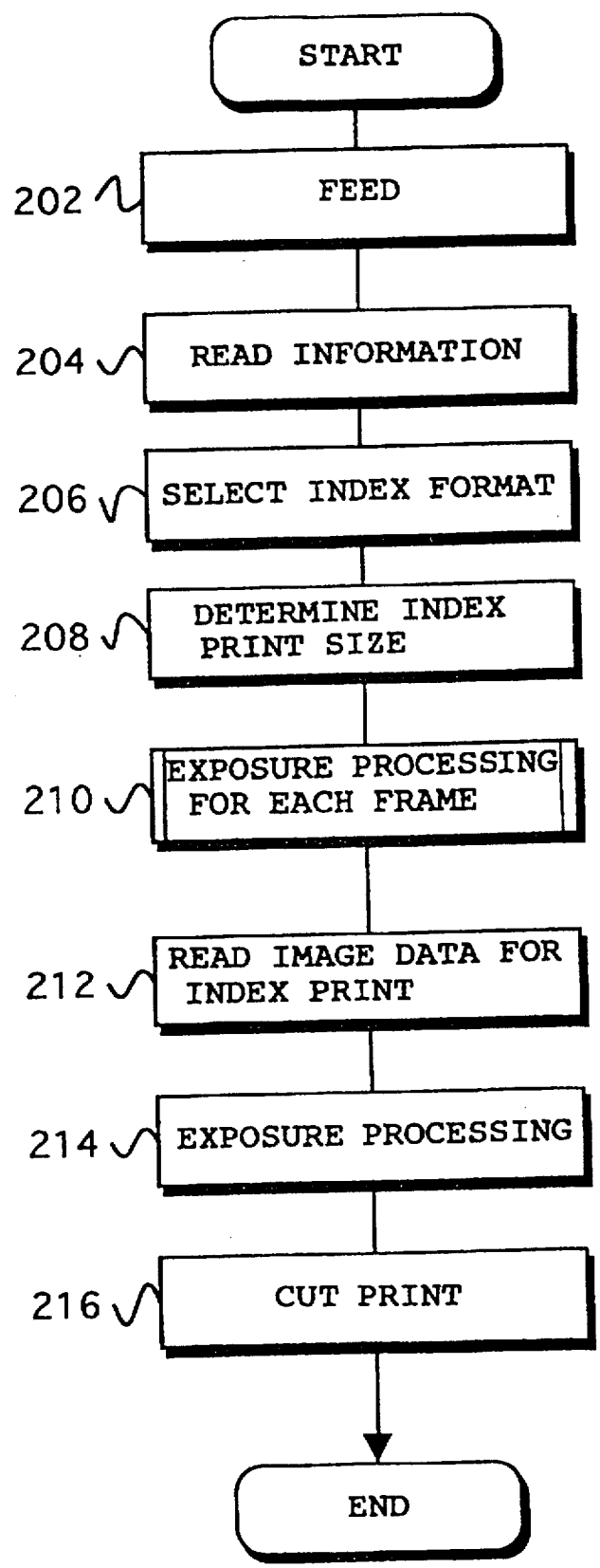
FIG. 1 is a flow chart showing a flow of a main control routine of the present invention.

Next, the operation of this embodiment will be explained. At first, when the negative film 10 after development processing is arranged in the photograph printer 100, a main control routine in FIG. 1 is executed. In a step 202, the negative film 10 is fed, and magnetic information recorded on the negative film 10 is read in a step 204 in accordance with the feed. In the next step 206, the number of frames of the negative film capable of use for photographing is extracted from the read magnetic information, and a corresponding index format is selected according to the extracted number of frames. Namely, as described above, the three types of index formats Fa, Fb and Fc are stored beforehand in this embodiment, in which the index format Fa is selected in the case of not more than 15 frames, the index format Fb is selected in the case of exceeding 15 frames but not more than 27 frames, or the index format Fc is selected in the case of exceeding 27 frames but not more than 39 frames.

In the next step 208, the index print size is determined corresponding to the selected index format. Namely, the size is determined to the L size when the index format Fa is selected, to the H size when the index format Fb is selected, or to the P size when the index format Fc is selected. In the next step 210, the negative film 10 is subjected to exposure processing for each of the frames. In the exposure processing in the step 210, as described in detail below, the image data for index printing are also accumulated in accordance with the index format.

When the exposure processing for each of images is completed for one roll of the negative film 10, the routine proceeds to a step 212 to read the image data for index printing stored in the frame memory 50 (see FIG. 3). In the next step 214, exposure processing of images to be formed by the read image data, that is index printing of index print images is conducted. Upon completion of the exposure processing, the mark 88 for cutting the index print is exposed in the next step 216 in accordance with the index print size determined in the step 208, and this routine is ended.

Figure 10:
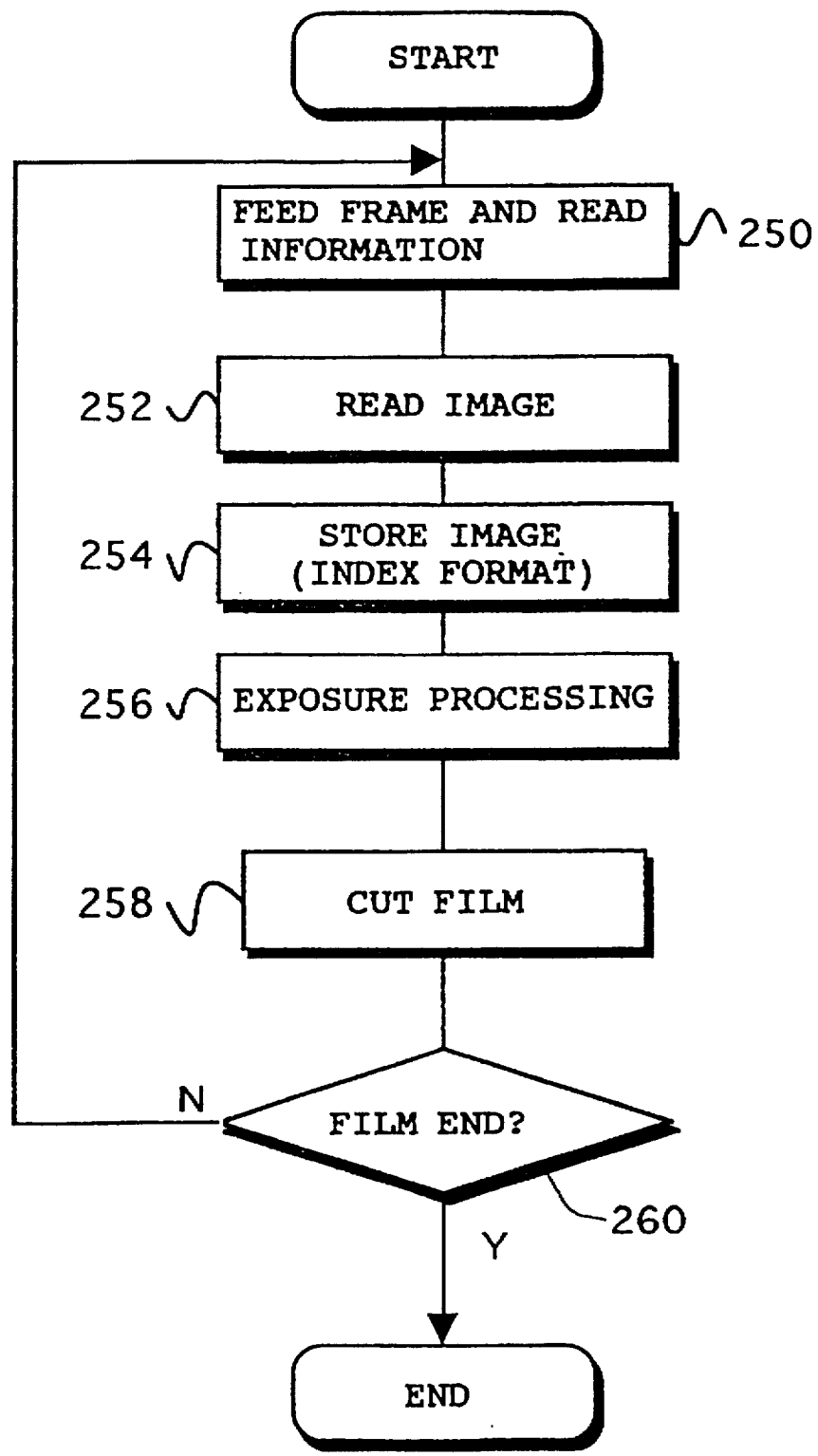
FIG. 10 is a flow chart showing a flow of exposure processing for every one frame of a negative film.

Upon proceeding to the exposure processing for every one frame of the negative film 10 in the step 210 described above, the negative film 10 is fed, and magnetic information for every frame is read in a step 250 in FIG. 10. In the next step 252, the image frame is positioned to an exposure position, and the image of the positioned image frame is read. The exposure processing is conducted by using the color line printer 25 according to the image data of the read image, the image data of the image in exposure are converted into an image for index printing (to adapt to the index frame 92), and the converted image data are stored in the frame memory 50 (steps 254, 256). After completion of the exposure processing for every image frame, the marks 88 (FIG. 11) are exposed in the next step 258 for cutting of the color paper sheet 26 into the size corresponding to the image frames. The processing described above is repeatedly executed until completion for all image frames on one roll of the negative film 10 (step 260).

As described above, in this embodiment, the images are adapted to each of the index frames of the index format determined in accordance with the number of photograph frames, and the size of the generated index print is set to the predetermined size. Thus the index print can be formed on one sheet with the identical size of the index frames in any of the print sizes of the L, H and P sizes usually used as the print size irrelevant to the number of photograph frames on the negative film, and the color paper sheet 26 can be utilized effectively without loss.

When the print of each size is formed with a coincident length in the widthwise direction of the color paper sheet, the print of photographed images is respectively formed in a desired size, and the size of the generated index frames is coincident irrelevant to the number of photograph frames. Therefore, the index frame is never reduced due to the number of photograph frames. Thus it is possible to produce the index print which can be distinguished easily.

The instance in which all images read from the negative film 10 are index-printed has been explained in the embodiment described above, however, the present invention can be also applied to an instance in which only images read from the negative film 10 as images to be printed are printed (exposed and processed). In this instance, the number of printed frames is counted, and the counted value may be treated as the number of photograph frames. When images corresponding to only printed images are index-printed, the number of printed frames is counted, and the index format may be selected in accordance with the counted value. This procedure is preferable for utilizing the color paper sheet without loss because the index print can be produced by skipping index frames having no necessity for printing due to exposure failure and the like.

When only images having necessity for printing are printed (exposed and processed) as described above, the index print may be formed by selecting the index format in accordance with the number of photograph frames capable of use for photographing on one roll of the negative film, so that index frames corresponding to frames which are not printed are blank spaces. By doing so, frames having no necessity for printing due to exposure failure and the like can be easily distinguished from the index print. Thus a user (photographer) can judge an optimum photographing condition in the case of, for example, continued photographing.

In the embodiment described above, the application to the negative film photographed with an identical frame size is easily understood, however, alternative application is also possible to a negative film in which a plurality of different frame sizes are present in a mixed manner. For example, a cinema size (89×205 mm, aspect ratio: 2.30) and a square size (89×89 mm, aspect ratio: 1.0) are known other than the sizes described above. The application to a negative film having a plurality of different frame sizes in a mixed manner is possible in order to obtain these print sizes.

Figure 12:
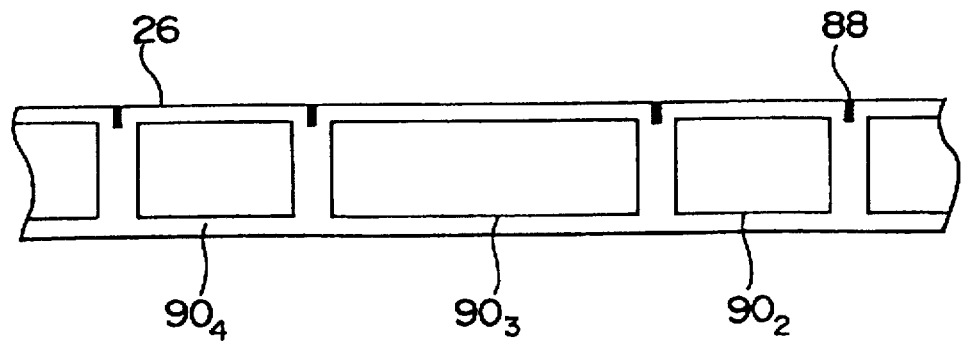
FIG. 12 is an image view showing a color paper sheet containing prints having different sizes.

Namely, in general, the print size is changed by changing the length in the feed direction while setting the width of a roll paper sheet to be constant. For example, when a second print image frame $90_2$ has the L size, a third print image frame $90_3$ has the P size, and a fourth print image frame $90_4$ has the L size, as shown in FIG. 12, sizes having changed lengths in the feed direction are used. In this instance, the images may be contracted or enlarged in the image interpolation circuit 48 described above to adapt them to the index frames by using a predetermined frame size (for example, L size) as a standard. Therefore, as shown in FIG. 13, the index print of a negative film in which a plurality of different frame sizes are present in a mixed manner is formed by adapting each photograph frame of the negative film to the size of the index frame in each index frame. By doing so, frame sizes contained in one roll of negative film can be also distinguished easily from the index print. Also in this instance, the size of the index print is determined in accordance with the number of frames. Thus the index print can be formed on one sheet with the identical size of the index frames in the set print size irrelevant to the number of photograph frames of the negative film, and the color paper sheet 26 can be utilized effectively without loss.

In the embodiment described above, the instance in which the index print is produced for one roll of negative film has been explained. However, alternative application is also possible to a lengthy roll film formed by connecting a plurality of negative films. In this instance, it is available to judge whether or not another negative film is continued after completion of the processing for every one roll of negative film in the flow chart in FIG. 1 described above. Namely, in the step 260 in FIG. 10, splice tapes for connecting negative films or perforations are detected to judge whether or not an film end is reached. Upon detection of them, it is judged that the processing for one roll of negative film is completed. In this instance, a sort signal for representing an order of each of negative films may be used. Further, an operator may instruct completion of processing for one roll of negative film by means of key input. After completion of the step 216 in FIG. 1, it is judged whether or not the negative film is continued. In the case of continuance, the routine returns to the step 202, while in the case of discontinuance, the routine is ended.

The size of the index print is determined in accordance with the number of frames of a film. Accordingly, a user or an operator of a DPE store or laboratory can also judge the number of frames contained in the film by only glancing the index print.

The application to the color printer has been explained in the embodiment described above, however, alternative application to a monochrome printer is also possible. The printing exposure has been performed by scanning the color paper sheet by using the laser beams, however, the printing exposure may be performed by using a flat CRT or a liquid crystal line printer.

According to the present invention, as explained above, the index print is produced corresponding to the predetermined index format information, and images to be printed on photographic paper having an approximately coincident size are produced. Thus an effect is obtained that the index of a photographic film can be formed on one index print, and the photographic paper can be used effectively irrelevant to the number of photograph frames.

While the embodiments of the present invention, as herein disclosed, constitute a preferred form, it is to be understood that other forms might be adopted.

What is claimed is:

1. An apparatus for preparing index prints comprising:
   image storing means for storing images obtained by image pick-up from photograph frames formed on a photographic film;
   photograph frame number detecting means for detecting a number of photograph frames on said photographic film;
   storing means for storing a plurality of index format information for arrangements of said photograph frames;
   selecting means for selecting an index format from said plurality of index format information in accordance with said number of photograph frames; and
   forming means for forming an index print of said photographic film by printing said stored images onto printing paper to correspond to the selected index format, wherein the size of the images to be printed onto said printing paper is previously determined, and the size of the printing paper is determined depending on the number of the stored images.

2. An apparatus for preparing index prints comprising:
   image storing means for storing images obtained by image pick-up from photograph frames formed on a photographic film;
   photograph frame number detecting means for detecting a number of photograph frames on said photographic film;
   storing means for storing a plurality of index format information for arrangements of said photograph frames;
   selecting means for selecting an index format from said plurality of index format information in accordance with said number of photograph frames;
   determining a size for a means for determining photographic paper in accordance with said selected index format information; and
   forming means for forming an index print of said photographic film by sequentially printing said images stored in said image storing means onto the printing paper having said determined size corresponding to an arrangement of said selected index format information selected by said selecting means.

3. The apparatus for preparing index prints according to claim 2, wherein said photograph frame number detecting means reads photograph frame number information for representing a number of all photograph frames on said photographic film previously recorded on said photographic film, and detects said photograph frame number information as said number of photograph frames of said photographic film.

4. The apparatus for preparing index prints according to claim 2, wherein said photograph frame number detecting means calculates a number of all photograph frames capable of use for photographing on said photographic film according to a distance of feed of said photographic film, and detects said calculated number of all photograph frames as said number of photograph frames of said photographic film.

5. The apparatus for preparing index prints according to claim 2, wherein said photograph frame number detecting means counts a number of all photograph frames capable of use for photographing on said photographic film, and detects said counted number of all photograph frames as said number of photograph frames of said photographic film.

6. The apparatus for preparing index prints according to claim 2, wherein a number of all photograph frames capable of use for photographing on said photographic film is previously input into said apparatus, and said photograph frame number detecting means detects said input number of all photograph frames as said number of photograph frames of said photographic film.

7. The apparatus for preparing index prints according to claim 2, wherein said photograph frame number detecting means reads photograph frame number information for representing a number of all photograph frames of said photographic film previously recorded on said photographic film, counts a number of photograph frames having photographic failure, and detects a value obtained by subtracting said number of photograph frames having photographic failure from said number of all photograph frames as said number of photograph frames of said photographic film.

8. The apparatus for preparing index prints according to claim 2, wherein said photograph frame number detecting means calculates a number of all photograph frames capable of use for photographing on said photographic film according to a distance of feed of said photographic film, counts a number of photograph frames having photographic failure, and detects a value obtained by subtracting said number of photograph frames having photographic failure from said number of all photograph frames as said number of photograph frames of said photographic film.

9. The apparatus for preparing index prints according to claim 2, wherein said photograph frame number detecting means counts a number of all photograph frames capable of use for photographing on said photographic film, counts a number of photograph frames having photographic failure, and detects a value obtained by subtracting said number of photograph frames having photographic failure from said number of all photograph frames as said number of photograph frames of said photographic film.

10. The apparatus for preparing index prints according to claim 2, wherein said plurality of index format information stored in said storing means include an index format for 15 frames used for a negative film wherein the number of frames capable of use for photographing on one roll of negative film is not more than 15 frames, an index format for 27 frames used for a negative film wherein the number of frames capable of use for photographing exceeds 15 frames but is not more than 27 frames, and an index format for 39 frames used for a negative film wherein the number of frames capable of use for photographing exceeds 27 frames but is not more than 39 frames.

11. The apparatus for preparing index prints according to claim 10, wherein said determining means determines to use photographic paper having a size corresponding to an L size when said selecting means selects said index format for 15 frames, said determining means determines to use photographic paper having a size corresponding to an H size when said selecting means selects said index format for 27 frames, and said determining means determines to use photographic paper having a size corresponding to a P size when said selecting means selects said index format for 39 frames.

12. A method for preparing index prints comprising the steps of:

reading magnetic information comprising a number of photograph frames of a negative film in accordance with feed of said negative film;

selecting an index format according to said read number of photograph frames of said negative film;

determining printing paper size corresponding to said selected index format;

exposing and processing each frame of said negative film to accumulate image data corresponding to said selected index format;

reading said accumulated image data upon completion of the exposure processing of said negative film to conduct index printing on said printing paper by using said read image data; and cutting said printing paper subjected to the index printing in accordance with the selected index format.

13. A method for preparing index prints comprising the steps of:

reading magnetic information comprising a number of photograph frames of a negative film;

selecting an index format according to said read number of photograph frames of said negative film;

determining printing paper size corresponding to said selected index format;

exposing and processing each frame of said negative film to accumulate image data;

reading said accumulated image data to conduct index printing on said printing paper by using said read image data.

14. An apparatus for preparing index prints from frames of a photographic film comprising:

image storing means for storing images obtained by image pick-up from frames formed on the photographic film;

counting means for counting a number of frames on the photographic film;

format storing means for storing a plurality of index format information for arrangement of frames;

selecting means, responsive to said counting means, for selecting an index format from said plurality of index format information stored in said format storing means in accordance with the counted number of frames;

determining means, responsive to said selecting means, for determining a size for a photographic paper, and for varying at least one of: the length and width of the photographic paper in accordance with said selected index format; and forming means for forming an index print of the photographic film by printing the stored images onto printing paper as determined by said determining means and said selected index format.

* * * * *